United States Patent
Sekiguchi

(10) Patent No.: US 6,665,614 B2
(45) Date of Patent: Dec. 16, 2003

(54) VEHICLE SURROUNDINGS MONITORING APPARATUS AND VEHICLE TRAVELING CONTROL SYSTEM INCORPORATING THE APPARATUS

(75) Inventor: Hiroyuki Sekiguchi, Tokyo (JP)

(73) Assignee: Fuji Jukogyo Kabushiki Kaisha, Tokyo (*) Notice: Subject to any disclaimer, the term of this patent is extended or adjusted under 35 U.S.C. 154(b) by 0 days.

(21) Appl. No.: 10/413,119

(22) Filed: Apr. 14, 2003

(65) Prior Publication Data

US 2003/0195704 A1 Oct. 16, 2003

(30) Foreign Application Priority Data

Apr. 16, 2002 (JP) ..................................... 2002-113870

(51) Int. Cl.[7] .............................................. G06F 17/10
(52) U.S. Cl. ......................................... 701/301; 701/96
(58) Field of Search ................................. 701/300, 301, 701/302, 96; 340/903, 904, 435, 436; 342/455; 180/271

(56) References Cited

U.S. PATENT DOCUMENTS 5,301,115 A * 4/1994 Nouso ........................ 701/301
6,411,901 B1 * 6/2002 Hiwatashi et al. ........... 701/301
6,567,749 B2 * 5/2003 Matsura ...................... 701/301

FOREIGN PATENT DOCUMENTS

JP 06-213659 8/1994

* cited by examiner

Primary Examiner—Richard M. Camby
(74) Attorney, Agent, or Firm—Darby & Darby

(57) ABSTRACT

A vehicle surroundings monitoring apparatus inputs images from a stereoscopic camera and signals of vehicle speeds, steering angle and yaw rate and detects front information such as solid object data, side wall data and lane marker data to estimate a traveling path of an own vehicle from the front information and traveling conditions of the own vehicle. Further, the apparatus establishes the position of lane markers on the traveling path of the own vehicle and determines the position of solid objects and side walls in terms of the traveling path of the own vehicle. Further, the apparatus extracts a preceding vehicle traveling ahead of the own vehicle and outputs information about the preceding vehicle to a traveling control unit for controlling a traveling of the own vehicle.

17 Claims, 12 Drawing Sheets

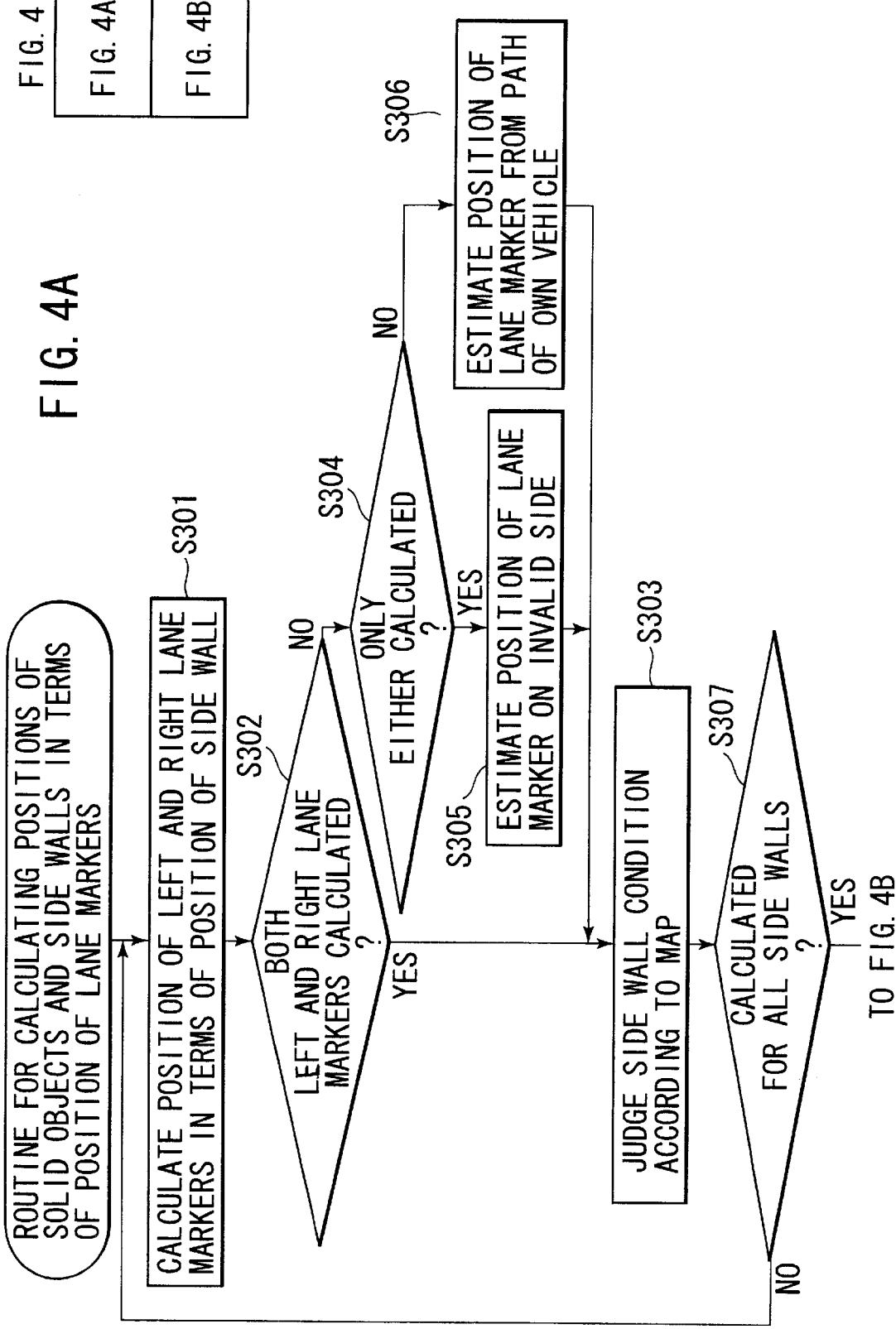

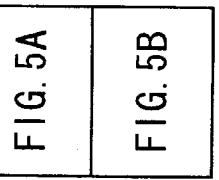
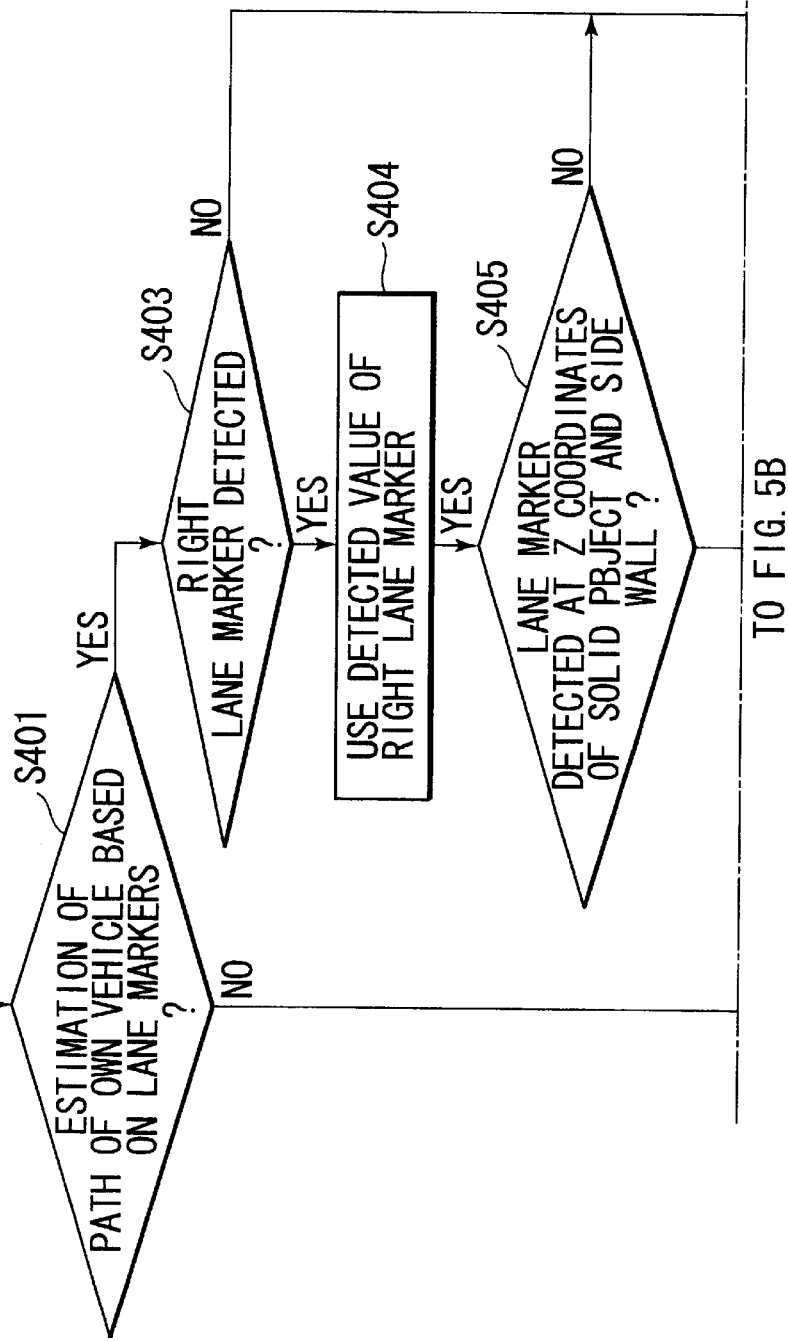
FIG. 5A

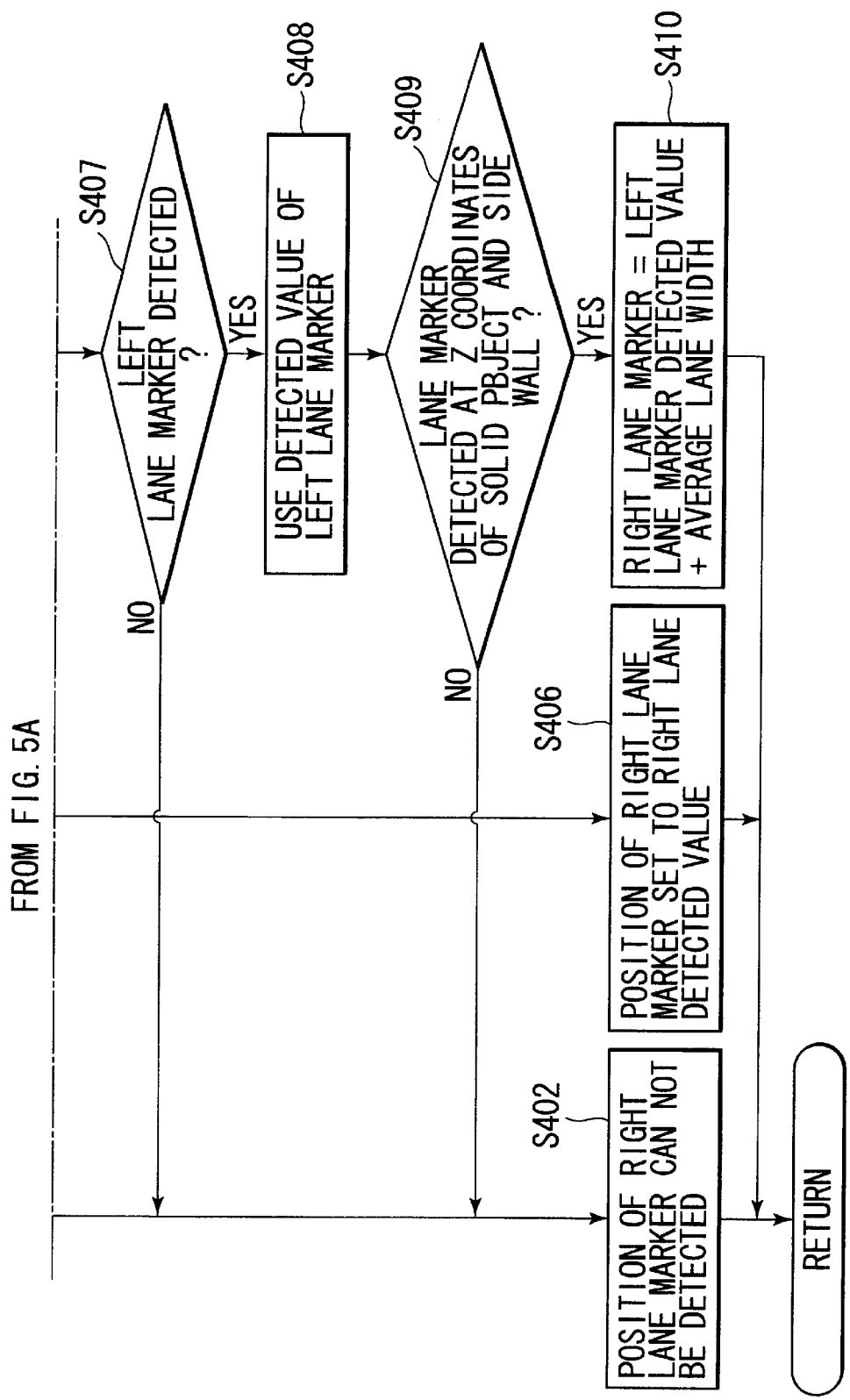

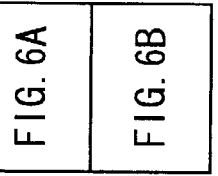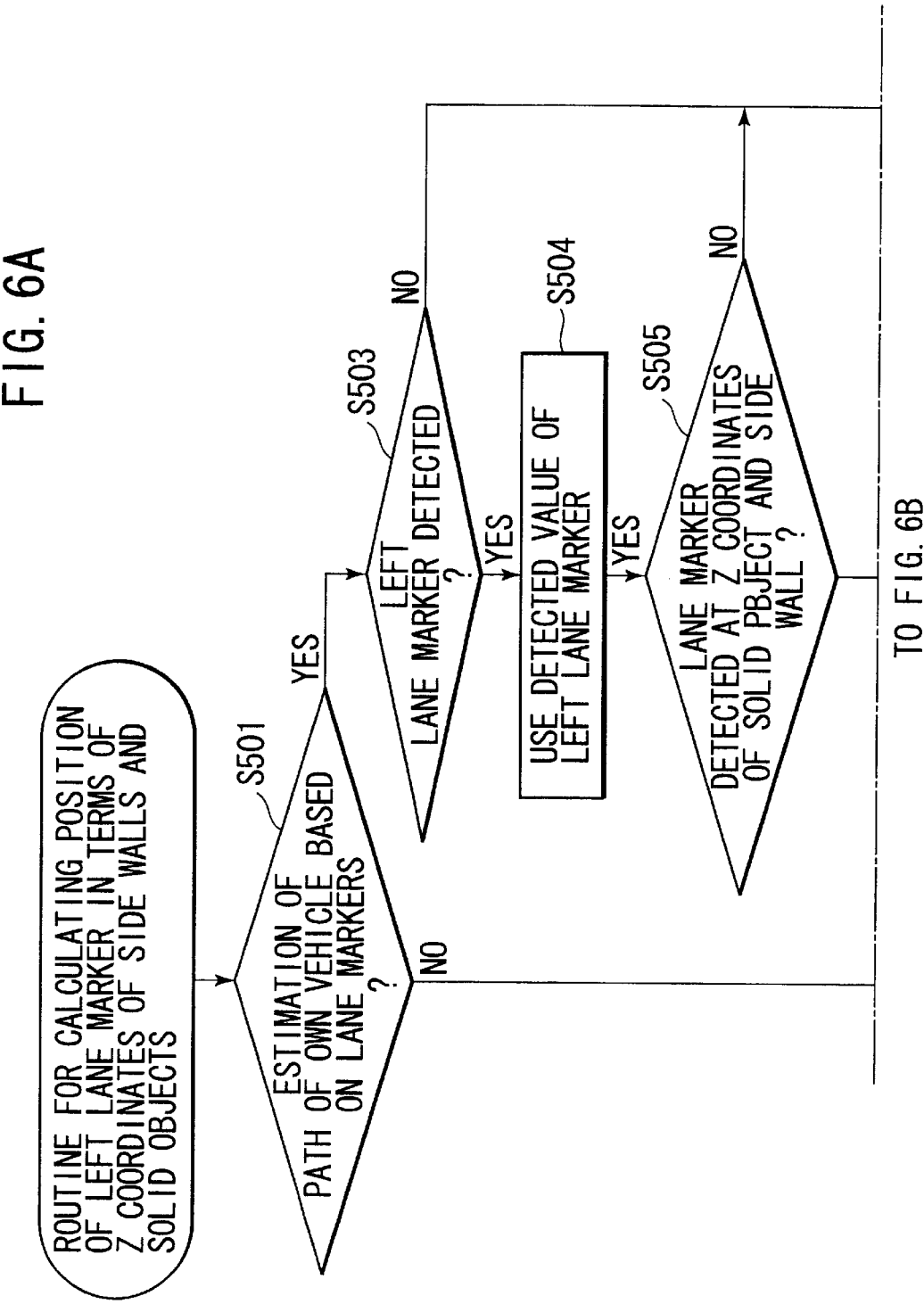

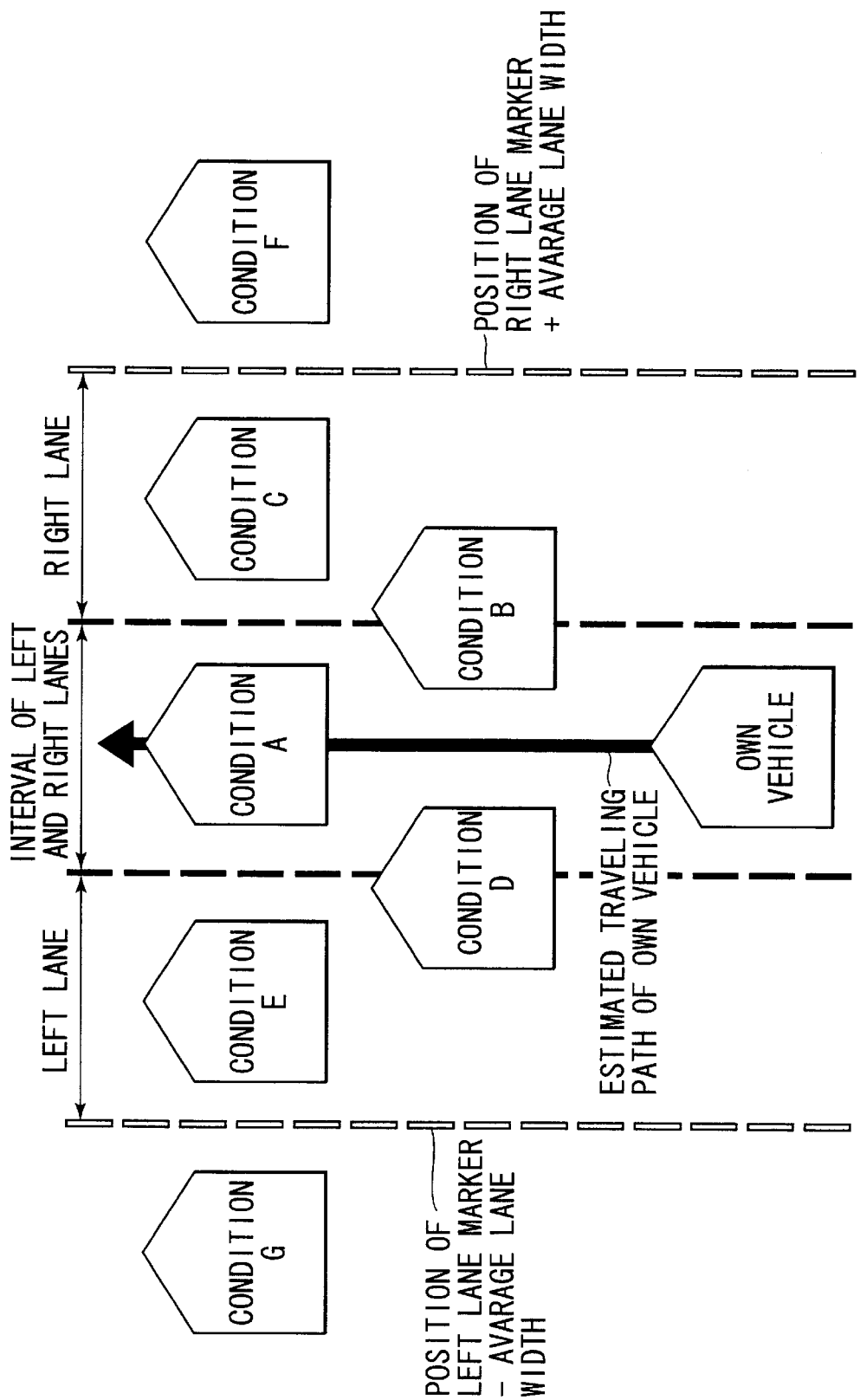

VEHICLE SURROUNDINGS MONITORING APPARATUS AND VEHICLE TRAVELING CONTROL SYSTEM INCORPORATING THE APPARATUS

The disclosure of Japanese Patent Application No. 2002-113870 filed on Apr. 16, 2002 including the specification, drawings and abstract is incorporated herein by reference in its entirety.

BACKGROUND OF THE INVENTION

1. Field of the Invention

The present invention relates to a vehicle surroundings monitoring apparatus and more particularly to a vehicle surroundings monitoring apparatus capable of recognizing not only a solid object including a preceding vehicle in front of an own vehicle but also a solid object located in neighboring lanes. Further, the present invention relates to a vehicle traveling control system incorporating the vehicle surroundings monitoring apparatus.

2. Discussion of Related Art

In recent years, such a traveling control apparatus as detecting a preceding vehicle by monitoring cameras mounted on a vehicle and making a control to follow up the preceding vehicle or to keep an intervehicle distance between the own vehicle and the preceding vehicle constant, has been put into practical use.

In the traveling control apparatus, it is preferable not only to detect a solid object located on the lane where the own vehicle travels but also to detect a solid object located in adjacent left and right lanes in order to make a proper estimation control.

For example, Japanese Patent Application Laid-open No. Toku-Kai-Hei 6-213659 discloses a technology in which left and right lane markers of a lane on which the own vehicle travels are detected and not only a solid object on the lane of the own vehicle but also a solid object on the neighboring lanes are detected based on the detected lane markers.

However, the aforesaid prior technology is formed on the premise that the left and right lane markers of the lane on which the own vehicle travels are detected. Therefore, in case where the lane markers of the own vehicle are not detected, there is a problem that solid objects ahead can not be identified. That is, there are various lanes such as a lane having left and right lane markers, a lane having a lane marker only on either of left and right sides, and a lane having no lane marker on either of left and right sides. Further, sometimes the lane markers are obstructed by a solid object and the like and sometimes it is difficult to recognize the lane markers depending upon the weather conditions or the shadow condition. Hence, the aforesaid prior art has a very limited scope of application.

SUMMARY OF THE INVENTION

It is an object of the present invention to provide a vehicle surroundings monitoring apparatus capable of properly identifying a solid object ahead under a variety of conditions, irrespective of whether or not a lane marker exists on a road or the lane marker can be detected. It is another object of the present invention to provide a multi-purpose vehicle surroundings monitoring apparatus capable of making an accurate traveling control based on the estimated change of the traveling circumstances. It is further object of the present invention to provide a vehicle traveling control system equipped with the vehicle surroundings monitoring apparatus.

In order to achieve the objects, the vehicle surroundings monitoring apparatus comprises traveling condition detecting means for detecting a traveling condition of an own vehicle, front information detecting means for detecting front information of at least data of a solid object, data of a side wall and data of a lane marker, lane marker position establishing means for estimating a traveling path of the own vehicle according to at least either of the front information and the traveling condition of the own vehicle and for establishing a position of the lane marker in the traveling path of the own vehicle, solid object and side wall position establishing means for establishing a position of the solid object and a position of the side wall in terms of the position of the lane marker, own vehicle traveling trace detecting means for detecting a traveling trace of the own vehicle, preceding vehicle extracting means for extracting a preceding vehicle traveling ahead of the own vehicle and preceding vehicle traveling trace detecting means for detecting a traveling trace of the preceding vehicle. Further, the vehicle surroundings monitoring apparatus outputs information of about the preceding vehicle to a traveling control unit for controlling a traveling of the own vehicle.

BRIEF DESCRIPTION OF THE DRAWINGS

FIGS. 5 (5A & 5B) is a flowchart showing a routine for calculating positions of solid objects and side walls on a Z coordinate on the basis of a right lane marker;

FIG. 7 is an explanatory diagram showing an example of maps for classifying positions of solid objects and side walls;

DETAILED DESCRIPTION OF THE PREFERRED EMBODIMENTS

Figure 1:
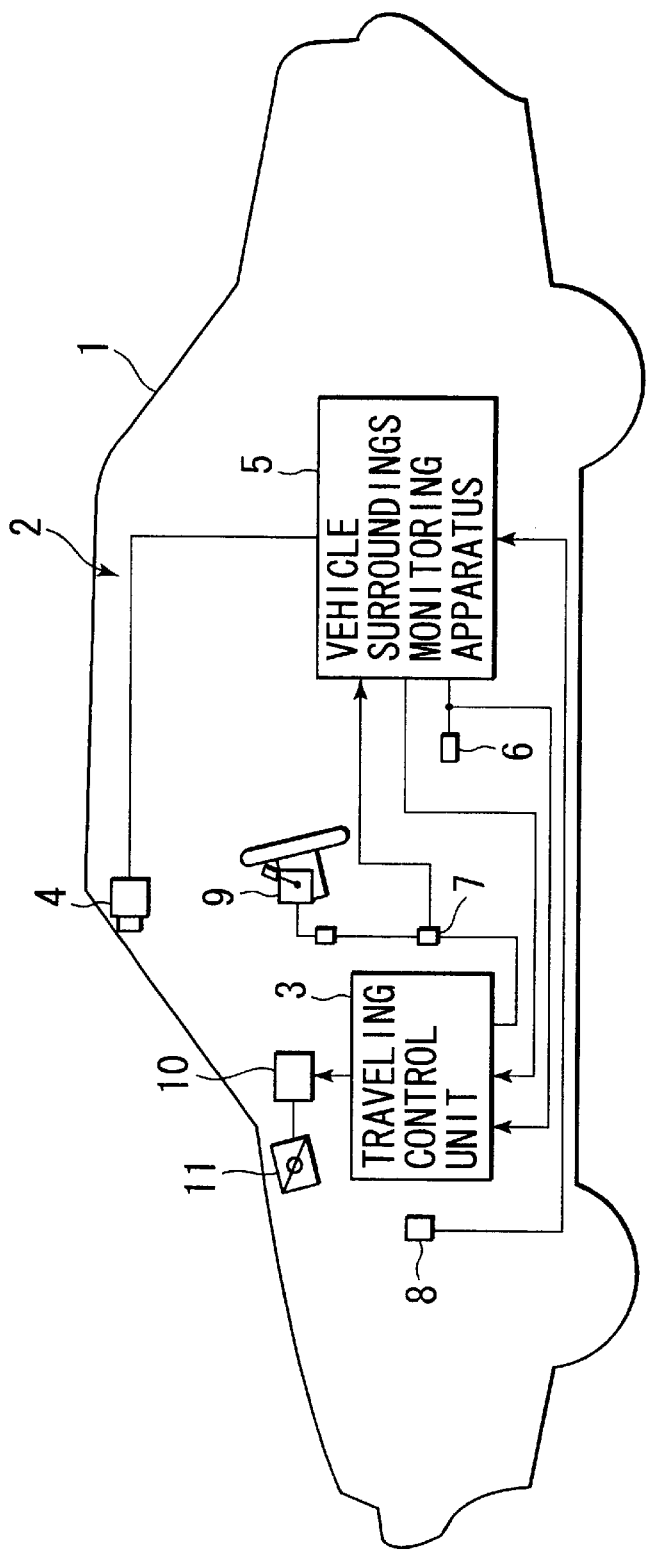
FIG. 1 is a diagrammatic illustration of a traveling control system having a vehicle surroundings monitoring apparatus according to a preferred embodiment of the present invention.

Referring now to FIG. 1, reference numeral 1 denotes a vehicle (own vehicle) on which an Adaptive Cruise Control (ACC) 2 is mounted. The ACC system 2 is constituted by a traveling control unit 3, a stereoscopic camera 4 and a vehicle surroundings monitoring apparatus 5. when the ACC system 2 is established to a constant traveling mode, the system controls the vehicle 1 so as to maintain a vehicle speed established by a vehicle operator and when the system 2 is established to a follow-up mode, the system controls the vehicle 1 so as to maintain a predetermined distance between the own vehicle and a preceding vehicle to be constant according to positional information of solid objects ahead of the own vehicle.

The stereoscopic camera 4 constituting front information detecting means is composed of a pair (left and right) of CCD cameras using a solid-state image component such as Charge Coupled Device and the left and right cameras are transversely mounted on a front ceiling of a passenger compartment at a specified interval of distance, respectively. The respective cameras take picture images of an outside object from different view points and input the picture images to the vehicle surroundings monitoring apparatus 5.

Further, the vehicle 1 has a vehicle speed sensor 6 for detecting a vehicle speed and the detected vehicle speed is inputted to the traveling control unit 3 and the vehicle surroundings monitoring apparatus 5, respectively. Further, the vehicle 1 has a steering wheel angle sensor 7 for detecting a steering wheel angle and a yaw rate sensor 8 for detecting a yaw rate and the detected steering wheel angle and yaw rate signals are inputted to the vehicle surroundings monitoring apparatus 5. These sensors act as vehicle traveling condition detecting means.

The vehicle surroundings monitoring apparatus 5 inputs respective signals indicative of picture images of the stereoscopic camera 4, vehicle speeds, steering angle, yaw rate and detects frontal information of solid object data, side wall data and lane marker data in front of the vehicle 1 based on the images inputted from the stereoscopic camera 4. Thus, the traveling path of the own vehicle is estimated from the front information and the traveling conditions of the own vehicle 1. Further, the position of lane markers on the traveling path of the own vehicle and the position in terms of the lane markers of solid objects and side walls are established according to respective flowcharts which will be described hereinafter. Further, the vehicle surroundings monitoring apparatus 5 extracts a preceding vehicle (vehicle traveling ahead of the own vehicle 1) and thus classified information is outputted to the traveling control unit 3. That is, the vehicle surroundings monitoring apparatus 5 is furnished with functions of front information detecting means, lane marker position establishing means, solid object and side wall position establishing means and preceding vehicle extracting means.

Describing the processing of images from the stereoscopic camera 4 in the vehicle surroundings monitoring apparatus 5, with respect to a pair of stereoscopic images taken by the stereoscopic camera 4, distance information over the entire image is obtained from the deviation amount between corresponding positions according to the principle of trianguration and a distance image representing three-dimensional distance distribution is formed on the basis of the distance information. Then, lane marker data, side wall data such as guardrails, curbs and side walls provided along the road and solid object data such as vehicles and the like, are extracted on the basis of the distance image by means of the known grouping process and the like by referring to the three-dimensional road profile data, side wall data, solid object data and the like stored beforehand. Thus extracted lane marker data, side wall data and solid object data are denoted by different numbers respectively.

The traveling control unit 3 is equipped with a function of a constant speed traveling control for maintaining the vehicle speed at a value inputted by the vehicle operator and a function of a follow-up traveling control for following up the preceding vehicle in a condition to keep the intervehicle distance between the own vehicle and the preceding vehicle constant. The traveling control unit 3 is connected with a constant speed traveling switch 9 constituted by a plurality of switches operated by a constant speed traveling selector lever provided on the side surface of a steering column, the vehicle surroundings monitoring apparatus 5, the vehicle speed sensor 6 and the like.

The constant speed traveling switch 9 is constituted by a speed setting switch for setting a target vehicle speed at the constant speed traveling, a coast switch for changing the target vehicle speed in a descending direction and a resume switch for changing the target vehicle speed in an ascending direction. Further, a main switch (not shown) for turning the traveling control on or off is disposed in the vicinity of the constant speed traveling selector lever.

When the vehicle operator turns the main switch on and sets a desired vehicle speed by operating the constant speed traveling selector lever, a signal indicative of the desired vehicle speed inputs from the constant speed traveling switch 9 to the traveling control unit 3 and a throttle valve 11 driven by a throttle actuator 10 makes a feed-back control so as to converge the vehicle speed detected by the vehicle speed sensor 6 to the established vehicle speed. As a result, the own vehicle can travel at a constant speed automatically.

Further, when the traveling control unit 3 makes a constant traveling control, supposing a case where the vehicle surroundings monitoring apparatus 5 recognizes a preceding vehicle traveling at a lower speed than the established vehicle speed, the traveling control unit 3 automatically changes over to a follow-up traveling control in which the own vehicle travels with the established intervehicle distance retained.

When the traveling control is transferred to the follow-up traveling control, a target value of an appropriate intervehicle distance between the own vehicle 1 and the preceding vehicle is established based on the intervehicle distance obtained by the vehicle surroundings monitoring apparatus 5, the vehicle speed of the own vehicle 1 detected by the vehicle speed sensor 6 and the vehicle speed of the preceding vehicle obtained from the intervehicle distance and the vehicle speed of the own vehicle 1. Further, the traveling control unit 3 outputs a drive signal to the throttle actuator 10 and makes a feed-back control of the opening angle of the throttle valve so that the intervehicle distance agrees with the target value and controls the own vehicle 1 in a condition to follow up the preceding vehicle with the intervehicle distance retained. When the vehicle is in the follow-up control condition, in case where the intervehicle distance between the own vehicle 1 and the preceding vehicle becomes larger than the target value, a drive signal is outputted to the throttle actuator 10 to accelerate the own vehicle 1. However, when a signal indicative of the detection of a solid object on a lane adjacent to the own lane is outputted from the vehicle surroundings monitoring apparatus 5, the drive signal for accelerating the own vehicle 1 is outputted to the throttle actuator 10 at a more delayed timing than usual or in a more moderate manner than usual.

Figure 2:
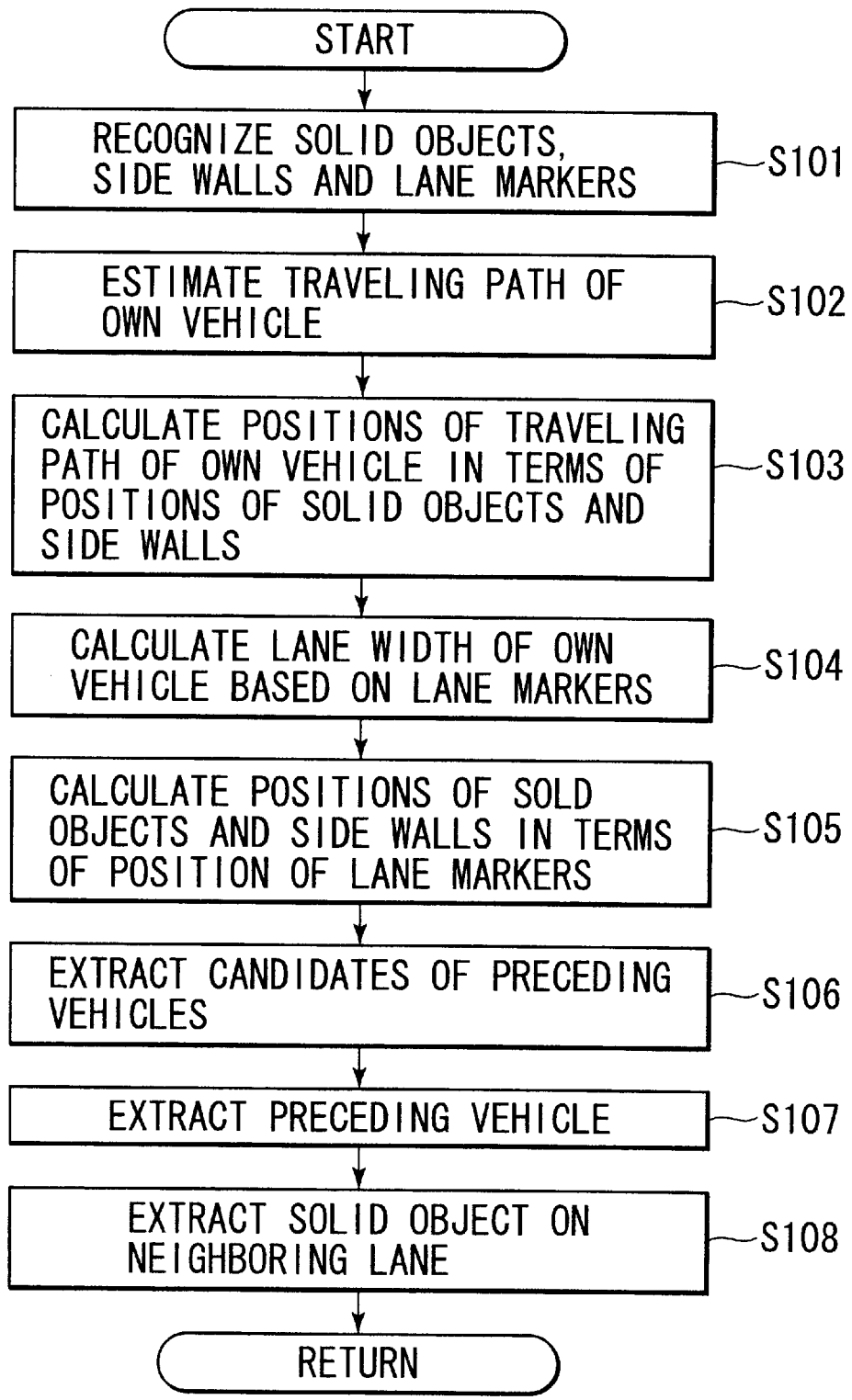
FIG. 2 is a flowchart showing a routine for monitoring vehicle surroundings.

Describing the vehicle surroundings monitoring program executed every 50 milliseconds in the vehicle surroundings monitoring apparatus 5 by referring to the flowchart illustrated in FIG. 2, first at a step (hereinafter abbreviated as S) 101, solid object data, side wall data including guardrails, curbs and the like provided along the road and lane marker data are recognized based on the basis of images taken by the stereoscopic camera 4.

Next, the program goes to S102 where the traveling path of the own vehicle is estimated according to the following four methods:

Method A: Estimation of Traveling Path Based on Lane Markers

In case where both left and right lane markers data or either of left and right lane markers data are obtained and the profile of the lane on which the own vehicle 1 travels can be estimated from these lane markers data, the traveling path of the own vehicle is formed in parallel with the lane markers in consideration of the width of the own vehicle 1 and the position of the own vehicle 1 in the present lane.

Method B: Estimation of Traveling Path Based on Side Wall Data

In case where both left and right side walls data or either of the left and right side walls data are obtained and the profile of the lane on which the own vehicle 1 travels can be estimated from these side walls data, the traveling path of the own vehicle is formed in parallel with the side walls in consideration of the width of the own vehicle 1 and the position of the own vehicle 1 in the present lane.

Method C: Estimation of Traveling Path Based on Trace of the Preceding Vehicle

The traveling path of the own vehicle 1 is estimated based on the past trace extracted from the solid object data of the preceding vehicle.

Method D: Estimation of Path Based on Trace of the Own Vehicle

The path of the own vehicle 1 is estimated based on the traveling conditions such as yaw rate γ, vehicle speed V and steering wheel angle θH of the own vehicle 1. An example of this method will be described as follows.

First, it is judged whether or not the yaw rate sensor 8 is effective. If it is effective, the present turning curvature Cua is calculated according to the following formula (1).

$$Cua=\gamma/V \qquad (1)$$

On the other hand, if the yaw rate sensor 8 is ineffective, it is judged whether or not the vehicle is steered at a steering angle δ more than a prescribed angle (for example 0.57 radian) obtained from the steering wheel angle δH. In case where the vehicle is steered at a steering angle more than 0.57 radian, the present turning curvature Cua is calculated according to the following formulas (2), (3) using the steering angle δ and the vehicle speed V of the own vehicle 1:

$$Re=(1+A\cdot V^2)\cdot(L/\delta) \qquad (2)$$

$$Cua=1/Re \qquad (3)$$

where Re is turning radius; A is stability factor of the vehicle; and L is wheelbase of the vehicle.

Further, if the steering angle is smaller than 0.57 radian, the present turning curvature is set to 0 (in a straightforward traveling condition).

Then, an average turning curvature is calculated from the sum of thus obtained present turning curvature Cua and a turning curvature for a past prescribed time (for example, 0.3 seconds) and the traveling path of the own vehicle is estimated.

Even in case where the yaw rate sensor 8 is effective and the turning curvature Cua is calculated according to the formula (1), if the steering angleδ is smaller than 0.57 radian, the present turning curvature Cua may be corrected to 0.

After the traveling path of the own vehicle is estimated, the program goes to S103 where the position of the traveling path is calculated in terms of the positions of respective solid objects and side walls.

In this embodiment, the coordinate system of the three-dimensional real space is transferred to a coordinate system fixed to the own vehicle. That is, the coordinate system is composed of X coordinate extending in a widthwise direction of the own vehicle, Y coordinate extending in a vertical direction of the own vehicle, Z coordinate extending in a lengthwise direction of the own vehicle and an origin of the coordinate placed on the road surface underneath the central point of two CCD cameras. The positive sides of X, Y and Z coordinates are established in a right direction, in an upward direction and in a forward direction, respectively. Thus, at S103, since the three-dimensional positions of the respective solid objects and side walls are established in the X, Y, Z coordinates, the position of the traveling path of the own vehicle is determined on the coordinates. Accordingly, X coordinate of the traveling path of the own vehicle in Z coordinates of the respective solid objects and side walls is determined by the processing at S103.

Figure 3:
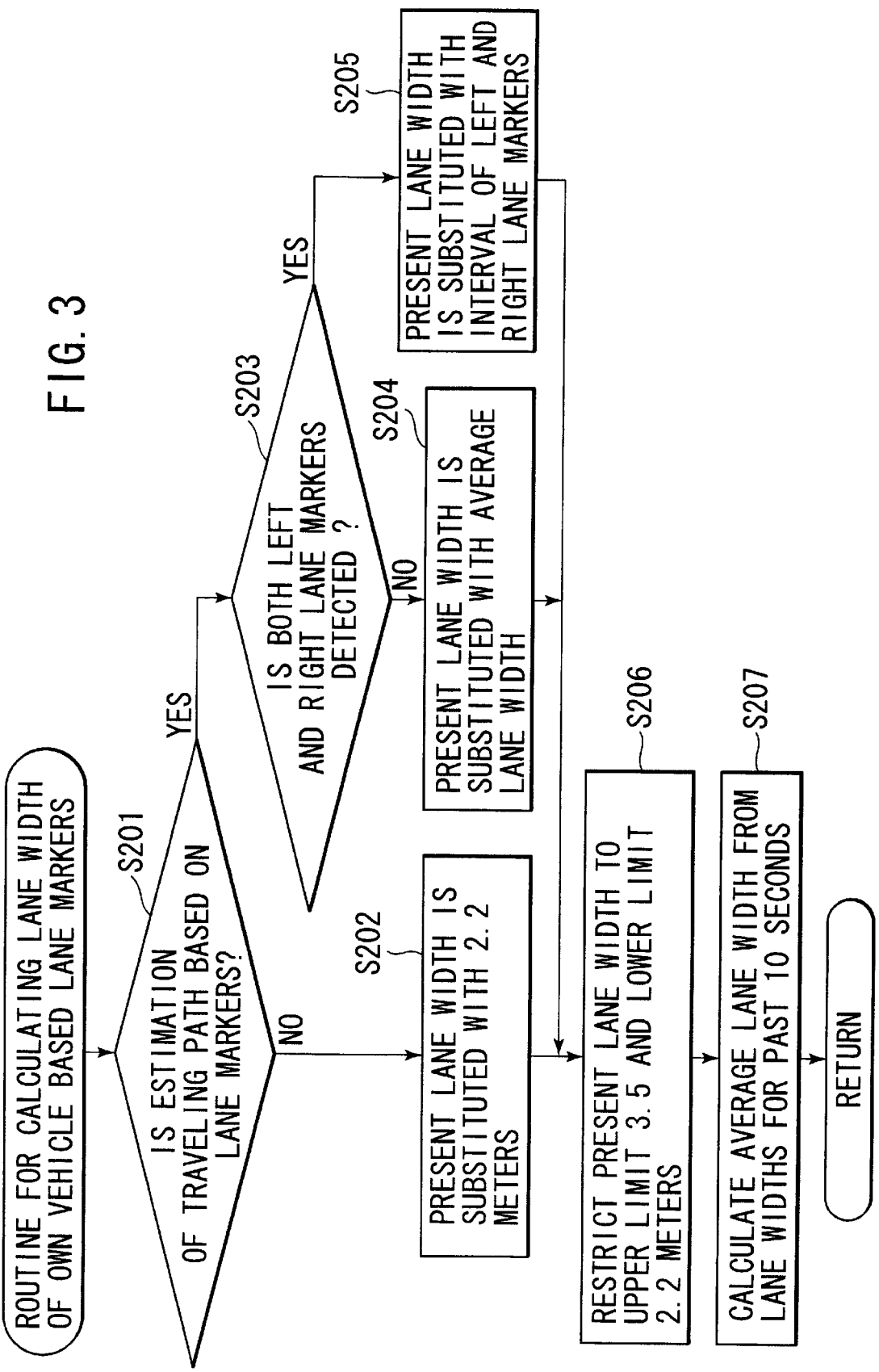
FIG. 3 is a flowchart showing a routine for calculating the width of a lane on which an own vehicle travels based on detected lane markers.

After the processing of S103, the program goes to S104 where the width of the own lane is calculated based on the detected lanes according to the flowchart shown in FIG. 3. First, at S201, it is judged whether or not the estimation of the traveling path of the own vehicle is based on the lane markers, that is, the estimation of the traveling path of the own vehicle is performed according to the method A.

In case where it is judged that the estimation of the traveling path of the own vehicle is not based on the lane markers, that is, the estimation of the traveling path of the own vehicle is performed according to either of the methods B, C and D, the program goes to S202 where the width of the present lane is substituted with 2.2 meters.

On the other hand, in case where it is judged that the estimation of the traveling path of the own vehicle is based on the lane markers, that is, the estimation of the own traveling path is performed according to the method A, the program goes to S203.

At S203, it is judged whether or not both left and right lane markers are detected and if both of the left and right lane markers are not detected (either one is detected), the program goes to S204 where the width of the present lane is substituted with an average width of the lane. If both left and right lane markers are detected, the program goes to S205 where the width of the present lane is substituted with an actual width between left and right lane markers.

After the present lane width is established at either of S202, S204 and S205, the program goes to S206 where the present lane width is limited to a ordinarily acceptable value for example between 3.5 and 2.2 meters so as not to be too large or too small. Then, at the next step S207, an average lane width is calculated from the lane widths collected for the past specified time (for example 10 seconds) and the program leaves the routine.

Figure 4B:
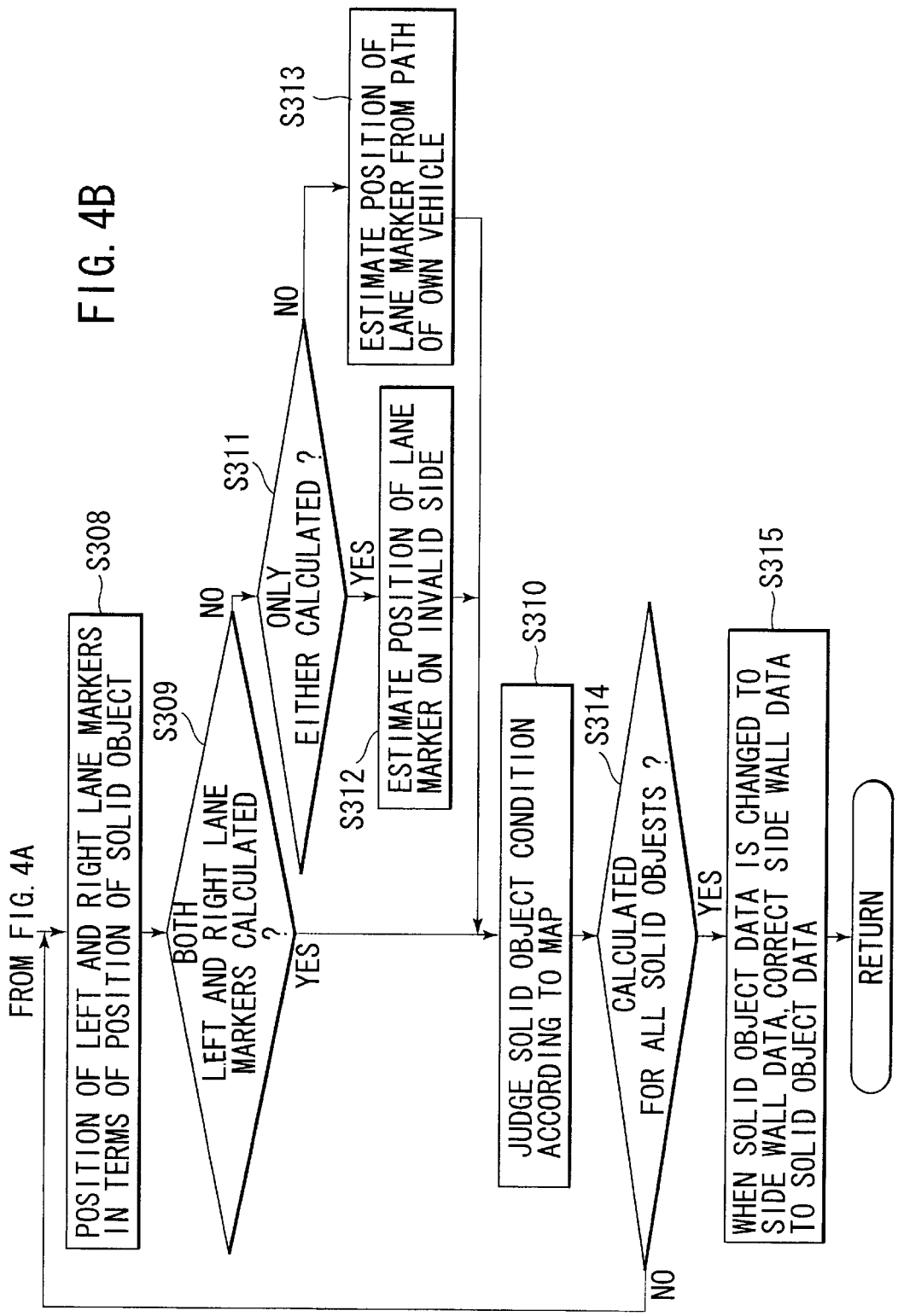
FIGS. 4 (4A & 4B) is a flowchart showing a routine for calculating positions of solid objects and side walls on the basis of lane markers.

Thus, after the lane width of the own vehicle is calculated based on the lane markers at S104, the program goes to S105 in which the positions of solid objects and side walls are calculated in terms of the position of lane markers. Specifically, the calculation is performed according to the flowchart of FIG. 4.

First, at S301, the position of the left and right lane markers in terms of Z coordinate of the side wall calculated. This calculation of the left and right lane markers is performed according to the flowcharts shown in FIG. 5 or FIG. 6, respectively.

Referring to FIG. 5, the routine for calculating the position of the right lane marker will be described. At S401, it is judged whether or not the estimation of the own traveling path is based on the lane markers, that is, the estimation is performed according to the method A.

In case where it is judged at S401 that the estimation of the own traveling path is not based on the lane markers, that is, the estimation of the own traveling path is performed according to either of the methods B, C and D, the program goes to S402 where it is judged that the right lane marker can not be detected and the program gets out of the routine.

On the other hand, in case where it is judged at S401 that the estimation of the own traveling path is based on the lane markers, that is, the estimation of the own path is performed according to the method A, the program goes to S403.

At S403, it is judged whether or not the right lane marker is detected. In case where it is judged that the right lane marker is detected, the program goes to S404 where it is determined that the detected value of the right lane marker is used for a reference point of the position of the right lane marker. Further, at S405, it is judged whether or not the lane marker is detected at Z coordinate points of the side wall and solid object. If it is judged that the lane marker is detected, the program goes to S406 where the position of the light lane marker is established to a detected value of the right lane marker and leaves the routine.

At S403, in case where it is judged that the right lane marker is detected, or at S405 in case where the lane marker is not detected at Z coordinate points of the side wall and solid object, the program goes to S407 where it is judged whether or not the left lane marker is detected.

In case where it is judged at S407 that the left lane marker is not detected, the program goes to S402 where it is judged that the right lane marker can not be detected and then leaves the routine.

Further, in case where it is judged at S407 that the left lane marker is detected, the program goes to S408 where it is determined that the detected value of the left lane marker is used for a reference point of the position of the right lane marker and steps to S409.

At S409, it is judged whether or not the lane marker is detected at z coordinate points of the side wall and solid object. If the lane marker is detected, the program goes to S410 where the position of the right lane marker is established to a left lane marker detected value plus an average lane width calculated at S207 and leaves the routine. On the other hand, if the lane marker is not detected, the program goes to S402 where it is determined that the position of the right lane marker can not be detected and then leaves the routine.

Figure 6B:
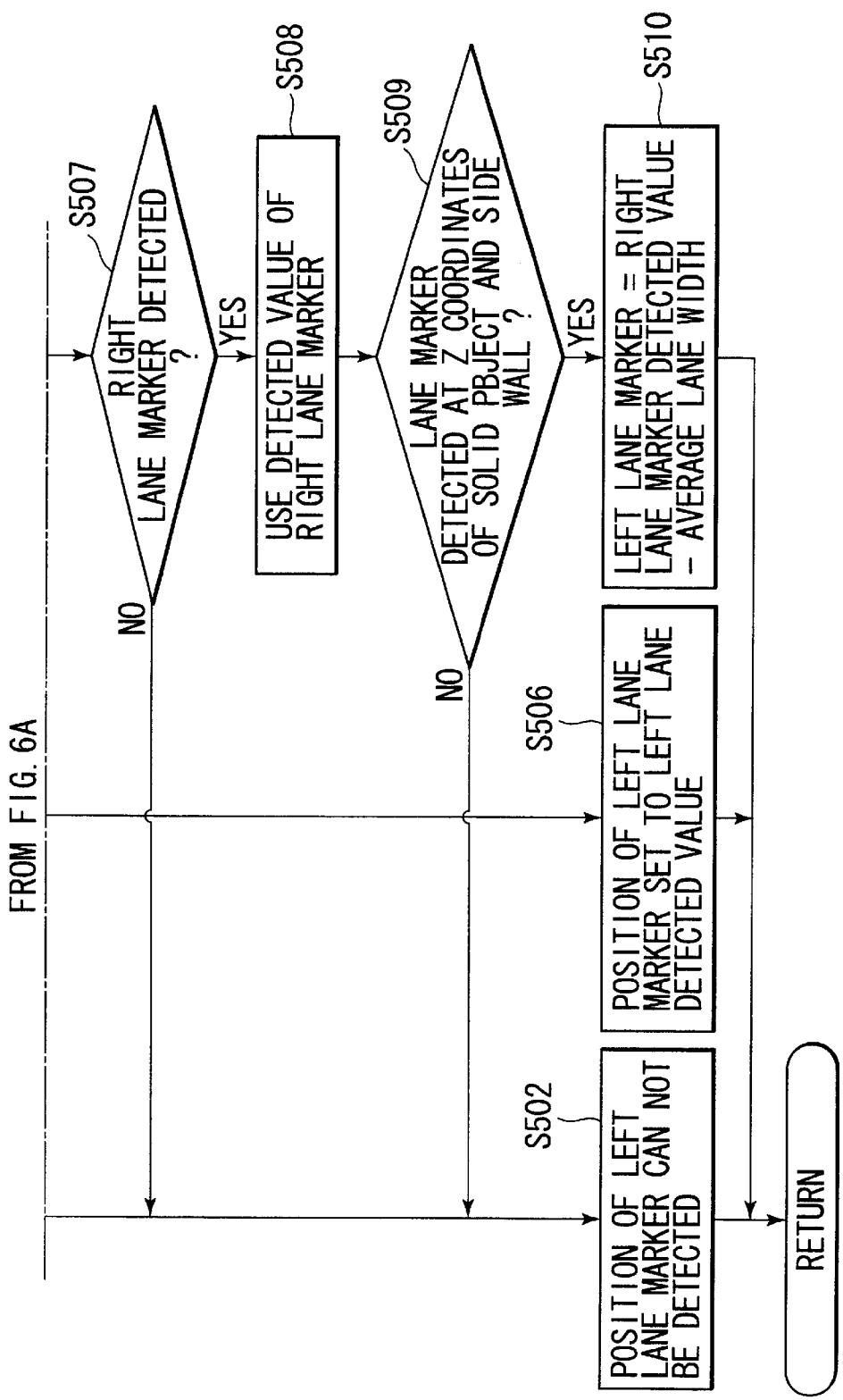
FIGS. 6 (6A & 6B) is a flowchart showing a routine for calculating positions of solid objects and side walls on a Z coordinate on the basis of a left lane marker.

Next, a routine for calculating the position of right lane marker in terms of Z coordinate of the side wall and solid object will be described by referring to FIG. 6. The routine of FIG. 6 is paired with the routine of FIG. 5. At S501, it is judged whether or not the estimation of the own path is based on the lane markers, that is, the estimation is performed according to the method A.

In case where it is judged at S501 that the estimation of the own path is not based on the lane markers, that is, the estimation of the own path is performed according to either of the methods B, C and D, the program goes to S502 where it is judged that the left lane marker can not be detected and the program gets out of the routine.

On the other hand, in case where it is judged at S501 that the estimation of the own traveling path is based on the lane markers, that is, the estimation of the own traveling path is performed according to the method A, the program goes to S503.

At S503, it is judged whether or not the left lane marker is detected. In case where it is judged that the left lane marker is detected, the program goes to S504 where it is determined that the detected value of the left lane marker is used for a reference point of the position of the left lane marker. Further, at S505, it is judged whether or not the lane marker is detected at Z coordinate points of the side wall and solid object. If it is judged that the lane marker is detected, the program goes to S506 where the position of the left lane marker is established to a detected value of the left lane marker and leaves the routine.

At S503, in case where it is judged that the left lane marker is detected, or at S505 in case where the lane marker is not detected at Z coordinate points of the side wall and solid object, the program goes to S507 where it is judged whether or not the right lane marker is detected.

In case where it is judged at S507 that the right lane marker is not detected, the program goes to S502 where it is judged that the left lane marker can not be detected and then leaves the routine.

Further, in case where it is judged at S507 that the right lane marker is detected, the program goes to S508 where it is determined that the detected value of the right lane marker is used for a reference point of the position of the left lane marker and steps to S509.

At S509, it is judged whether or not the lane marker is detected at Z coordinate points of the side wall and solid object. If the lane marker is detected, the program goes to S510 where the position of the left lane marker is established to a right lane marker detected value minus an average lane width calculated at S207 and leaves the routine. On the other hand, if the lane marker is not detected, the program goes to S502 where it is determined that the position of the left lane marker can not be detected and then leaves the routine.

At the steps S403, S407, S503, S507 of the flowcharts shown in FIG. 5 and FIG. 6, it is merely judged whether or not the lane marker is detected, however, in case where the lane marker is judged based on the magnitude of brightness, continuity and the like of lane marker, it can be judged whether or not the marker is detected based on the comparison of these data with threshold values.

Thus, after the positions of the left and right lane markers have been calculated at S301 according to the aforesaid routines of FIGS. 5 and 6, the program goes to S302.

At S302, it is judged whether or not both left and right lane markers are calculated. If yes, the program goes to S303 where the condition of side wall is judged according to a map showing positional relationships of the side wall in terms of X coordinate as illustrated in FIG. 7. The condition of side wall is classified into a condition A in which the side wall exists at an area between the left and right lane markers, a condition C in which the side wall exists at an area outside of the right lane marker, a condition B in which the side wall exists at an area crossing the right lane marker and an area in which the side wall exists outside of the left lane marker and a condition D in which the side wall exists at an area crossing the left lane marker. In case of the side wall data, the widthwise size is not detected, differently from the solid object data.

Therefore, the conditions B and D are omitted from the classification. Further, in case where the sidewall is recognized in the condition A, the side wall is recognized on the right or on the left in a projected manner according to the distance between the side wall and the left or right side wall.

As shown in a blank chain line of FIG. 7, another lane marker may be defined outside of the right lane marker at a position of the right lane marker plus the average lane width. Thus, two conditions C and F as described above may be recognized. Similarly, another lane marker may be defined outside of the left lane marker and two conditions E and G as described above are recognized.

On the other hand, at S302, in case where the positions of both lane markers are not calculated, the program goes to S304 where it is judged whether or not either of the left and right lane markers is calculated. In case where only either is calculated, the program goes to S305 where the position of a lane marker on the invalid side (the side on which no lane marker is calculated) is estimated from the position of the lane marker on the valid side (the side on which a lane marker is calculated) and the average lane width (the value calculated at S207). That is, in case where the position of the right lane marker is invalid, the position of the right lane marker is calculated from the position of the left lane marker plus the average lane width. On the contrary, in case where the position of the left lane marker is invalid, the position of the left lane marker is calculated from the position of the right lane marker minus the average lane width.

After the positions of the lane markers on both sides are estimated at S305, the program goes to S303 where the side wall condition is judged according to the map.

Further, in case where the position of the lane marker on either side is not calculated, the program goes to S306 where the positions of the lane markers on both sides are estimated from the position of the present path of the own vehicle and the average lane width and then goes to S303 where the side wall condition is judged according to the map.

After the processing at S303, the program goes to S307 where it is judged whether or not the side wall condition is finished to be calculated for all side walls. If finished, the program goes to S308 and if not yet finished, the program returns to S301 where the aforesaid processing is repeated.

When the program goes from S307 to S308, the positions of the left and right lane markers in terms of Z coordinate of the solid object are calculated. The calculation of the left and right lane markers at S308, is also performed according to the flowcharts described in FIG. 5 (calculation of the right lane marker) and in FIG. 6 (calculation of the left lane marker) in the same way as S301 and the program goes to S309 after finishing the calculation.

At S309 it is judged whether or not the positions of the lane markers on both sides are calculated and in case where the positions of the lane markers on both sides are calculated, the program goes to S310 where it is judged which of condition A, condition B, condition C, condition D and condition E, the solid object is in according to the map described in FIG. 7.

On the other hand, at S309, in case where the positions of the lane markers on both sides are not calculated, the program goes to S311 where it is judged whether or not either of the left and right lane markers is calculated. In case where only either is calculated, the program goes to S312 where the position of a lane marker on the invalid side (the side on which no lane marker is calculated) is estimated from the position of the lane marker on the valid side (the side on which a lane marker is calculated) and the average lane width (the value calculated at S207). That is, in case where the position of the right lane marker is invalid, the position of the right lane marker is calculated from the position of the left lane marker plus the average lane width. On the contrary, in case where the position of the left lane marker is invalid, the position of the left lane marker is calculated from the position of the right lane marker minus the average lane width.

After the positions of the lane markers on both sides are estimated at S312, the program goes to S310 where the solid object condition is judged according to the map.

Further, at S304, in case where the position of the lane marker on either side is not calculated at S311, the program goes to S313 where the positions of the lane markers on both sides are estimated from the position of the present traveling path of the own vehicle and the average lane width and then goes to S310 where the solid object condition is judged according to the map.

After the processing at S310, the program goes to S314 where it is judged whether or not the solid object conditions are finished to be calculated for all solid objects. If finished, the program goes to S315. If not finished, the program returns to S308, from which the aforesaid processing is repeated.

At S315, in case where an object which was taken as a solid object previously is taken as a side wall presently, the flag indicative of sidewall data is corrected to the flag indicative of solid object data. Thus, when the own vehicle 1 overtakes a solid object existing on a neighboring lane and as a result the rear surface of the object can not be detected, the solid object is prevented from being recognized erroneously as a side wall, this function raising an accuracy of recognition.

Thus, after the positions of solid objects and side walls in terms of positions of lane markers are finished to be calculated, that is, the processing of S105 is executed, the program goes to S106 where candidates of preceding vehicles are extracted.

At S106, the candidates of preceding vehicles are roughly selected including vehicles on-coming, vehicles parking and the like. For example, where the Z coordinate of a detected solid object is smaller than a threshold value which is determined according to detected distances of lane markers, detected distances of side walls, sizes of curves and the like, and when the number of detections of the object exceeds a specified value, that object is regarded as a candidate of preceding vehicle.

Then, the program goes to S107 where the preceding vehicle is extracted from the candidates. The extraction of the preceding vehicle is performed according to a routine for extracting a preceding vehicle shown in FIG. 8. First, at S601, it is judged whether the estimation of the path of the own vehicle is based on lane markers or based on the trace of the preceding vehicle, that is, whether the estimation of the path of the own vehicle is performed according to the method A or the method C at S102.

As a result of the judgment at S601, if the estimation of the path of the own vehicle is based on lane markers or based on the trace of the preceding vehicle, the program goes to S602 where a first preceding vehicle extracting process is carried out to extract a preceding vehicle and leaves the routine.

In the first preceding vehicle extracting process, when a solid object stays in a traveling zone for a threshold time and when it is judged that the object is closest to the own vehicle 1, the solid object is recognized as a preceding vehicle and is registered as such. On-coming vehicles are excluded from the candidates by calculating their relative speed with respect to the own vehicle 1. The traveling zone having a left width of 1.1 meters and a right width of 0.95 meters is provided around a center axis of the traveling path of the own vehicle. Further, the width of the traveling zone is designed so as to change according to the distance to the solid object and the registration time as a preceding vehicle.

On the other hand, at S601, in case where it is judged that the estimation of the traveling path of the own vehicle 1 is not based on lane markers or is not based on the traveling trace of the preceding vehicle, that is, in case where the estimation of the traveling path of the own vehicle is based on the side wall data or based on the traveling trace of the own vehicle 1, the program goes to S603 where it is judged whether or not the vehicle speed of the own vehicle 1 is less than 36 km/h and if less than 36 km/h, the program goes to S604 where a second preceding vehicle extracting process is carried out to extract a preceding vehicle, leaving the routine.

The second preceding vehicle extracting process is carried out as follows:

First, following traveling regions having a left width of 1.0 meter and a right width of 0.9 meter are provided around a center axis of the traveling path of the own vehicle 1:

$1^{st}$ region . . . region on which the own vehicle 1 travels for 0.8 seconds.

$2^{nd}$ region . . . region having a center axis of a traveling path of the own vehicle 1.

$3^{rd}$ region . . . region having a center axis of a traveling path. The traveling path is one newly established when assuming that the steering angle is returned from the present position to a neutral position (0°).

$4^{th}$ region . . . region having a center axis of a traveling path assuming to be straight.

$5^{th}$ region . . . region having a center axis of a traveling path. The traveling path is one newly established when assuming that the steering angle is steered from the present position by +10°.

$6^{th}$ region . . . region having a center axis of a traveling path. The traveling path is one newly established when assuming that the steering angle is returned from the present position by −10°.

A preceding vehicle candidate nearest to the own vehicle of respective $1^{st}$ to $6^{th}$ regions, is determined as a preceding vehicle of the respective regions. The preceding vehicle is selected according to the following steps:

Step 1. In case where there is a $1^{st}$ region preceding vehicle, the vehicle is regarded as a preceding vehicle and otherwise the following steps are taken.

Step 2. In case where the $3^{rd}$ region preceding vehicle or the $4^{th}$ region preceding vehicle is the same as the previous preceding vehicle, the $3^{rd}$ zone preceding vehicle is regarded as a preceding vehicle and otherwise there is no preceding vehicle in the $3^{rd}$ zone. In case where the $4^{th}$ region preceding vehicle is the same as the previous preceding vehicle, the $3^{rd}$ region preceding vehicle is regarded as the $4^{th}$ region preceding vehicle.

Step 3. In case where the $2^{nd}$ region preceding vehicle is the same as the previous preceding vehicle, the $2^{nd}$ region preceding vehicle is determined as a preceding vehicle in the $2^{nd}$ region. Otherwise, in case where there is no $3^{rd}$ preceding vehicle, it is judged that there is no preceding vehicle. Further, in case where there is a $3^{rd}$ region preceding vehicle, and in case where the $3^{rd}$ region preceding vehicle is the same as the previous preceding vehicle and the vehicle speed of the $3^{rd}$ region preceding vehicle is larger than that of the own vehicle 1, the $3^{rd}$ region preceding vehicle is determined as a preceding vehicle in the $3^{rd}$ region. In other cases, the step 4 is taken.

Step 4. In case where the preceding vehicle in the $5^{th}$ or $6^{th}$ regions is located further than the $2^{nd}$ region preceding vehicle and the $2^{nd}$ region preceding vehicle stays in the $2^{nd}$ region for more than 1 second, or in case where the preceding vehicle in the $5^{th}$ or $6^{th}$ zones is located nearer than the $2^{nd}$ region preceding vehicle and the $2^{nd}$ region preceding vehicle stays in the $2^{nd}$ region for more than 0.2 seconds, the $2^{nd}$ zone preceding vehicle is determined as a preceding vehicle in the $2^{nd}$ region. In other cases, it is determined that there is no preceding vehicle.

On the other hand, at S603, if it is judged that the vehicle speed of the own vehicle 1 is more than 36 km/h, the program goes to S605 where it is judged whether or not the estimation of the traveling path of the own vehicle 1 is based on the traveling trace of the own vehicle 1 and the vehicle travels straight or turns a loose curve.

At S605, if the estimation of the traveling path of the own vehicle is based on the traveling trace of the own vehicle 1 and the vehicle satisfies the traveling condition of traveling straight or turning a loose curve, the program goes to S602 where the aforesaid first preceding vehicle extracting process is carried out and otherwise the program goes to S606 where the third preceding vehicle extracting process is executed.

The third preceding vehicle extracting process at S606 will be executed as follows:

First, providing traveling zone having a left width of 1.0 meter and a right width of 0.9 meters around a center axis of the traveling path of the own vehicle 1, the following regions are established.

$1^{st}$ region . . . region on which the own vehicle travels for 0.8 seconds.

$2^{nd}$ region . . . region having a center axis of a traveling path of the own vehicle 1.

$3^{rd}$ region . . . region having a center axis of a traveling path. The traveling path is one newly established when assuming that the steering angle is steered from the present position by +10°.

$4^{th}$ region . . . region having a center axis of a traveling path. The traveling path is one newly established when assuming that the steering angle is returned from the present position by −10°.

A preceding vehicle candidate nearest to the own vehicle of respective $1^{st}$ to $4^{th}$ region, is determined as a preceding vehicle of the respective regions. The preceding vehicle is selected according to the following steps:

Step 1. In case where there is a $1^{st}$ region preceding vehicle, the vehicle is regarded as a preceding vehicle and otherwise the following steps are taken.

Step 2. In case where the $3^{rd}$ region preceding vehicle or the $4^{th}$ region preceding vehicle is the same as the previous preceding vehicle, the $3^{rd}$ zone preceding vehicle is regarded as a preceding vehicle. In this case, if the $4^{th}$ region preceding vehicle is the same as the previous preceding vehicle, the $3^{rd}$ region preceding vehicle is regarded as the $4^{th}$ region preceding vehicle. Otherwise, in case where the $4^{th}$ region preceding vehicle does not exist, the $3^{rd}$ region preceding vehicle also does not exist. In case where both $4^{th}$ region preceding vehicle and $2^{nd}$ region preceding vehicle exist, if the $4^{th}$ region preceding vehicle is further than the $3^{rd}$ region preceding vehicle, the $3^{rd}$ region preceding vehicle is regarded as the $4^{th}$ region preceding vehicle. In case where the $3^{rd}$ region preceding vehicle is substantially further than the $2^{nd}$ region preceding vehicle, the $3^{rd}$ region preceding vehicle does not exist.

Step 3. In case where the $2^{nd}$ region preceding vehicle is the same as the previous preceding vehicle, the $2^{nd}$ region preceding vehicle is determined to be a preceding vehicle in the $2^{nd}$ region. In case where the $2^{nd}$ region preceding vehicle is not the same as the previous preceding vehicle, and in case where the $2^{nd}$ region preceding vehicle is a forwardly moving object and in case where the $3^{rd}$ region preceding vehicle does not exist or the $3^{rd}$ region preceding vehicle is not the same as the previous preceding vehicle or the same but is a forwardly moving object, the $2^{nd}$ region preceding vehicle is a preceding vehicle. In other cases, in case where the $3^{rd}$ region preceding vehicle is not the same as the previous preceding vehicle, the $2^{nd}$ region preceding vehicle is a preceding vehicle.

Step 4. At this moment, in case where it is not yet determined that the $2^{nd}$ region preceding vehicle is a preceding vehicle, it is judged whether or not the number of entering the traveling region of the $2^{nd}$ region preceding vehicle is larger than a threshold value, the $2^{nd}$ region preceding vehicle is regarded as a preceding vehicle. If not, the $3^{rd}$ region preceding vehicle is regarded as a preceding vehicle.

Figure 8:
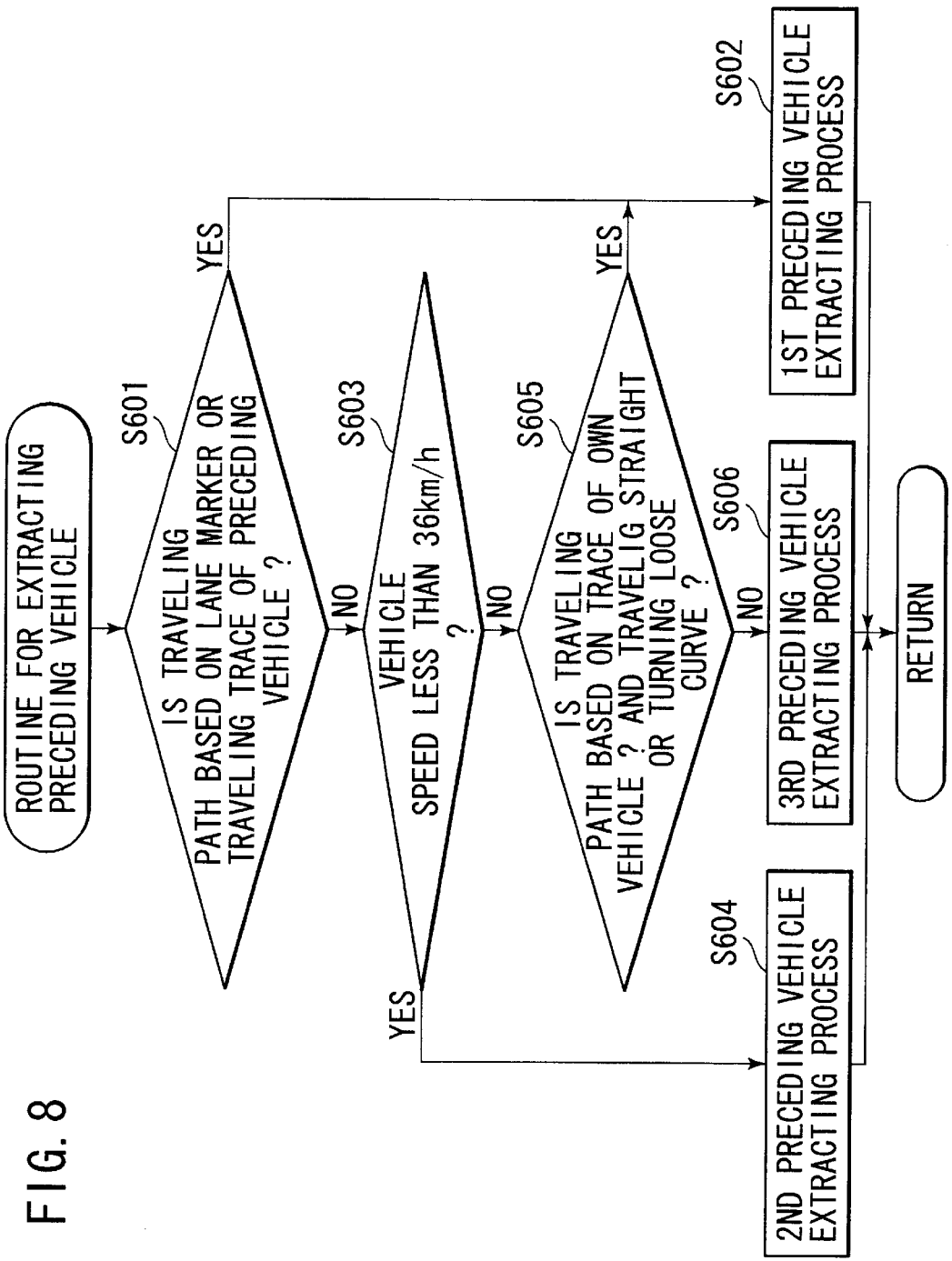
FIG. 8 is a flowchart showing a routine for extracting a preceding vehicle.
Figure 9:
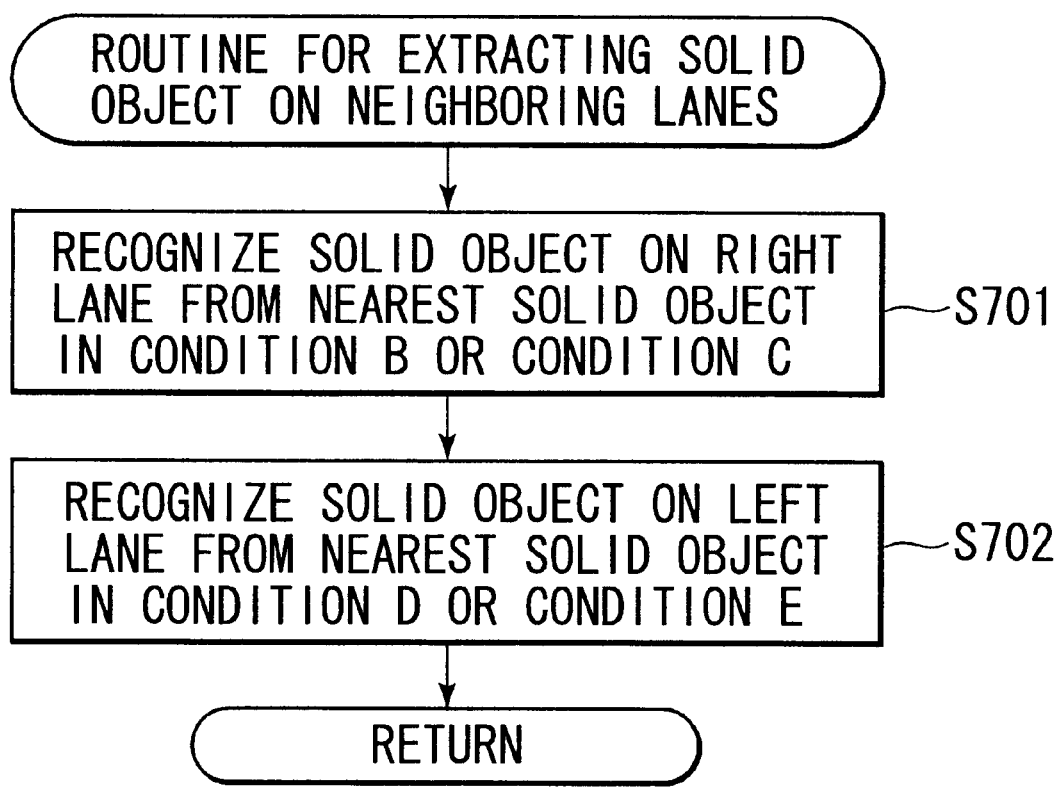
FIG. 9 is a flowchart showing a routine for extracting a solid object on an adjacent lane.

After the flowchart of FIG. 8 is thus executed, that is, after the processing of S107 is finished, the program goes to S108 where the extraction of a solid object on the neighboring regions is carried out according to the flowchart of FIG. 9 and then the program leaves the routine.

In the flowchart of FIG. 9, first at S701, when the solid objects other than the preceding vehicle extracted from the aforesaid map of S107 are in the condition B or in the condition C, the nearest one is regarded as a solid object on the right lane.

Next, at S702, when the solid objects other than the preceding vehicle extracted from the aforesaid map in S107 are in the condition D or in the condition E, the nearest one is regarded as a solid object on the left lane and the program leaves the routine.

In summary, according to the present invention, the solid object ahead of the own vehicle can be recognized properly under a variety of conditions irrespective of whether or not lane markers exist on the road or the lane markers can be detected and an accurate traveling control of the vehicle is available based on a proper estimation of changes of traveling conditions.

The entire contents of Japanese Patent Application No. Tokugan 2002-113870 filed Apr. 16, 2002, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A vehicle surroundings monitoring apparatus for monitoring traveling circumstances of an own vehicle, comprising:

traveling condition detecting means for detecting a traveling condition of said own vehicle;

front information detecting means for detecting front information of at least data of a solid object, data of a side wall and data of a lane marker;

lane marker position establishing means for estimating a traveling path of said own vehicle according to at least either of said front information and said traveling condition of said own vehicle and for establishing a position of said lane marker in said traveling path of said own vehicle;

solid object and side wall position establishing means for establishing a position of said solid object and a position of said side wall in terms of said position of said lane marker;

own vehicle traveling trace detecting means for detecting a traveling trace of said own vehicle;

preceding vehicle extracting means for extracting a preceding vehicle traveling ahead of said own vehicle; and preceding vehicle traveling trace detecting means for detecting a traveling trace of said preceding vehicle.

2. The vehicle surroundings monitoring apparatus according to claim 1, wherein said lane marker position establishing means estimate said traveling path of said own vehicle according to either of at least said data of said lane marker, said data of said side wall, said traveling trace of said preceding vehicle and said traveling trace of said own vehicle.

3. The vehicle surroundings monitoring apparatus according to claim 1, wherein said lane marker position establishing means estimate said traveling path of said own vehicle from a yaw rate, a vehicle speed and a steering angle.

4. The vehicle surroundings monitoring apparatus according to claim 1, wherein said lane marker position establishing means obtain an average value of a lane width based on said traveling path of said own vehicle and said data of said lane marker and establish said position of said lane marker in said traveling path of said own vehicle based on said traveling path of said own vehicle, said data of said lane marker and said average value of said lane width.

5. The vehicle surroundings monitoring apparatus according to claim 1, wherein said solid object and side wall position establishing means classify said solid object into a solid object on a lane on which said own vehicle travels, a solid object crossing a right lane, a solid object on said right lane, a solid object crossing a left lane, a solid object on said left lane and other solid objects and recognize as such.

6. The vehicle surroundings monitoring apparatus according to claim 1, wherein said solid object and side wall position establishing means, when data taken as a solid object previously are taken as data of side wall presently, correct said data of side wall data to data of solid object.

7. The vehicle surroundings monitoring apparatus according to claim 1, wherein said preceding vehicle extracting means extract said preceding vehicle according to said estimation of said traveling path of said own vehicle and said traveling condition of said own vehicle.

8. The vehicle surroundings monitoring apparatus according to claim 1, wherein said preceding vehicle extracting means, when a solid object existing in a predetermined traveling zone satisfies a prescribed condition, extract said solid object as a preceding vehicle.

9. A traveling control apparatus having the vehicle surroundings monitoring apparatus described in claim 1 control a traveling of a vehicle according to the conditions of said preceding vehicle and said solid object extracted by the vehicle surroundings monitoring apparatus.

10. A vehicle surroundings monitoring method of monitoring traveling circumstances of an own vehicle, comprising the steps of:

detecting a traveling condition of said own vehicle;

detecting front information of at least data of a solid object, data of a side wall and data of a lane marker;

estimating a traveling path of said own vehicle according to at least either of said front information and said traveling condition of said own vehicle and for establishing a position of said lane marker in said traveling path of said own vehicle;

establishing a position of said solid object and a position of said side wall in terms of said position of said lane marker;

detecting a traveling trace of said own vehicle;

extracting a preceding vehicle traveling ahead of said own vehicle; and detecting a traveling trace of said preceding vehicle.

11. A traveling control apparatus having the vehicle surroundings monitoring apparatus described in claim 2 control a traveling of a vehicle according to the conditions of said preceding vehicle and said solid object extracted by the vehicle surroundings monitoring apparatus.

12. A traveling control apparatus having the vehicle surroundings monitoring apparatus described in claim 3 control a traveling of a vehicle according to the conditions of said preceding vehicle and said solid object extracted by the vehicle surroundings monitoring apparatus.

13. A traveling control apparatus having the vehicle surroundings monitoring apparatus described in claim 4 control a traveling of a vehicle according to the conditions of said preceding vehicle and said solid object extracted by the vehicle surroundings monitoring apparatus.

14. A traveling control apparatus having the vehicle surroundings monitoring apparatus described in claim 5 control a traveling of a vehicle according to the conditions of said preceding vehicle and said solid object extracted by the vehicle surroundings monitoring apparatus.

15. A traveling control apparatus having the vehicle surroundings monitoring apparatus described in claim 6 control a traveling of a vehicle according to the conditions of said preceding vehicle and said solid object extracted by the vehicle surroundings monitoring apparatus.

16. A traveling control apparatus having the vehicle surroundings monitoring apparatus described in claim 7 control a traveling of a vehicle according to the conditions of said preceding vehicle and said solid object extracted by the vehicle surroundings monitoring apparatus.

17. A traveling control apparatus having the vehicle surroundings monitoring apparatus described in claim 8 control a traveling of a vehicle according to the conditions of said preceding vehicle and said solid object extracted by the vehicle surroundings monitoring apparatus.

\* \* \* \* \*